(12) United States Patent
Stephenson et al.

(10) Patent No.: US 8,800,254 B2
(45) Date of Patent: Aug. 12, 2014

(54) HARVESTING PLATFORM HAVING ANGLED CROP CONVERGING AUGER

(71) Applicant: Deere & Company, Moline, IL (US)

(72) Inventors: Roger D. Stephenson, Ottumwa, IA (US); Allan W. Rosenbalm, Blakesburg, IA (US); Charles S. Sloan, Blakesburg, IA (US)

(73) Assignee: Deere & Company, Moline, IL (US)

( * ) Notice: Subject to any disclaimer, the term of this patent is extended or adjusted under 35 U.S.C. 154(b) by 8 days.

(21) Appl. No.: 13/721,595

(22) Filed: Dec. 20, 2012

(65) Prior Publication Data

US 2014/0174050 A1  Jun. 26, 2014

(51) Int. Cl.
A01D 43/00 (2006.01)
A01D 57/00 (2006.01)

(52) U.S. Cl.
USPC .......................................................... 56/192

(58) Field of Classification Search
CPC .. A01D 34/668; A01D 34/667; A01D 34/664
USPC ...................... 56/192, 157, 14.5, 153, 16.4 R
See application file for complete search history.

(56) References Cited

U.S. PATENT DOCUMENTS

| | | | |
|---|---|---|---|
| 4,238,917 A * | 12/1980 | Oosterling et al. | 56/192 |
| 4,244,163 A * | 1/1981 | Gantzer et al. | 56/192 |
| 4,275,547 A * | 6/1981 | Oosterling et al. | 56/13.6 |
| 6,158,201 A * | 12/2000 | Pruitt et al. | 56/6 |
| 6,581,362 B2 | 6/2003 | Rosenbalm et al. | |
| 6,718,743 B2 * | 4/2004 | Rosenbalm et al. | 56/6 |
| 6,718,744 B2 * | 4/2004 | Rosenbalm et al. | 56/6 |
| 7,165,381 B2 | 1/2007 | Rosenbalm et al. | |
| 7,340,876 B1 * | 3/2008 | Barnett | 56/153 |
| 7,356,982 B2 * | 4/2008 | Barnett | 56/153 |
| 7,454,888 B2 * | 11/2008 | Barnett | 56/14.7 |
| 7,726,108 B1 * | 6/2010 | Pruitt et al. | 56/14.5 |
| 8,015,784 B2 * | 9/2011 | Barnett et al. | 56/157 |
| 8,069,640 B2 * | 12/2011 | Barnett et al. | 56/157 |
| 8,161,719 B2 | 4/2012 | Barnett et al. | |
| 8,240,114 B2 * | 8/2012 | Barnett | 56/6 |
| 8,286,411 B2 * | 10/2012 | Barnett et al. | 56/157 |
| 8,307,620 B1 * | 11/2012 | Barnett et al. | 56/157 |
| 8,341,927 B2 * | 1/2013 | Barnett | 56/157 |
| 8,434,290 B2 * | 5/2013 | Barnett et al. | 56/6 |
| 8,468,789 B2 * | 6/2013 | Barnett et al. | 56/157 |
| 2005/0126142 A1 * | 6/2005 | Rosenbalm et al. | 56/6 |
| 2008/0016837 A1 * | 1/2008 | Rosenbalm et al. | 56/192 |
| 2010/0269475 A1 * | 10/2010 | Barnett et al. | 56/157 |
| 2011/0005181 A1 * | 1/2011 | Barnett et al. | 56/157 |
| 2011/0005182 A1 * | 1/2011 | Barnett et al. | 56/157 |
| 2011/0005183 A1 * | 1/2011 | Barnett et al. | 56/157 |
| 2011/0277437 A1 * | 11/2011 | Barnett et al. | 56/157 |
| 2012/0216498 A1 * | 8/2012 | Barnett et al. | 56/157 |
| 2012/0279189 A1 * | 11/2012 | Barnett | 56/157 |
| 2012/0279190 A1 * | 11/2012 | Barnett et al. | 56/157 |

* cited by examiner

Primary Examiner — Árpád Fábián-Kovács

(57) ABSTRACT

A wide cut harvesting platform includes a rotary cutter bar having right- and left-hand outer and inner cutting units having respective inner and outer cutting discs at its opposite ends rotating in appropriate opposite directions for conveying cut crop from outer ends of the cutter bar to a central crop discharge path leading to a crop conditioning arrangement extending across the path. A first embodiment includes horizontal, right- and left-hand converging augers mounted so as to diverge forwardly above inner and outer cutting discs at the opposite ends of the cutter bar from locations at opposite sides of the discharge path and forward of the conditioner arrangement. A second embodiment includes first and second forwardly diverging augers like the first embodiment but being shorter and respectively terminating outwardly adjacent right- and left-hand converging drums respectively mounted to, and for rotating together with the right- and left-hand outer cutting discs.

7 Claims, 3 Drawing Sheets

HARVESTING PLATFORM HAVING ANGLED CROP CONVERGING AUGER

FIELD OF THE INVENTION

The present invention relates to wide crop harvesting platforms or headers having widths greater than crop conditioners to which rotary cutter bars of the platforms convey cut crops, and more specifically relates to apparatus for aiding in the convergence of the cut crop into the conditioners.

BACKGROUND OF THE INVENTION

Current production crop harvesting machines of the type having platforms for cutting a wide swath of standing crop are equipped with various crop converging apparatus designed for aiding in the conveyance of outboard severed crop toward conditioner apparatus located across a central crop discharge region of the platforms for receiving and conditioning the cut crop. One production platform, for example, includes a plurality of conveyor drums located at each side of the central crop discharge region and mounted for rotation about respective upright axes, with an outermost drum at each side of the crop discharge region being mounted for rotation with the outermost cutter disc, and with other drums being located where the crop condition have developed various apparatus for converging outboard severed crop. Such converging drums are disclosed in each of U.S. Pat. Nos. 6,581,362 and 7,165,381.

The following is a list of different converging apparatus used on current production crop harvesting machines of the stated type together with a disadvantage associated with the stated converging apparatus:

1) An undershot converging auger located behind and extending parallel to the cutter bar, having the disadvantage of not lifting the crop off the rotating cutter discs, resulting in the crop being re-cut and in increased power consumption;

2) U.S. Pat. No. 8,161,719 discloses an overshot converging auger having an axis that extends parallel to the axes of rotation of the conditioner rolls, having the disadvantage of the crop delivery paths of the opposite end sections of the auger are not direct;

3) A pair of outboard, vertical axis converging drums are provided at the opposite sides of the header and used together with an inboard stub auger having an axis that is parallel to those of the conditioner rolls, having the disadvantage of crop sometimes becoming wedged between the drums; and 4) Three outboard vertical axis converging drums are arranged along a line extending inward and to the rear from the adjacent side, having the disadvantage of crop sometimes becoming wedged between the drums.

What is needed then is a converging apparatus which overcomes the aforementioned disadvantages of the known converging apparatus.

SUMMARY OF THE INVENTION

According to the present invention, there is provided a harvesting header or platform equipped with a crop conditioner having a width less than that of the header or platform and to which crop is delivered by an improved crop converging apparatus.

An object of the invention is to provide a crop converging apparatus for a crop harvesting header including right and left augers having respective axes which converge towards the rear from opposite sides of the header.

This and other objects of the invention will become apparent from a reading of the ensuing description together with the appended drawings.

DESCRIPTION OF THE PREFERRED EMBODIMENT

Preliminarily, it is to be noted that while some structure may be stated as occurring in pairs or as being right- and left-hand members, only one of the pair, or one of the right- and left-hand members may be shown, with it to be understood that the other member is identical to, or a mirror image of, the one shown.

Figure 1:
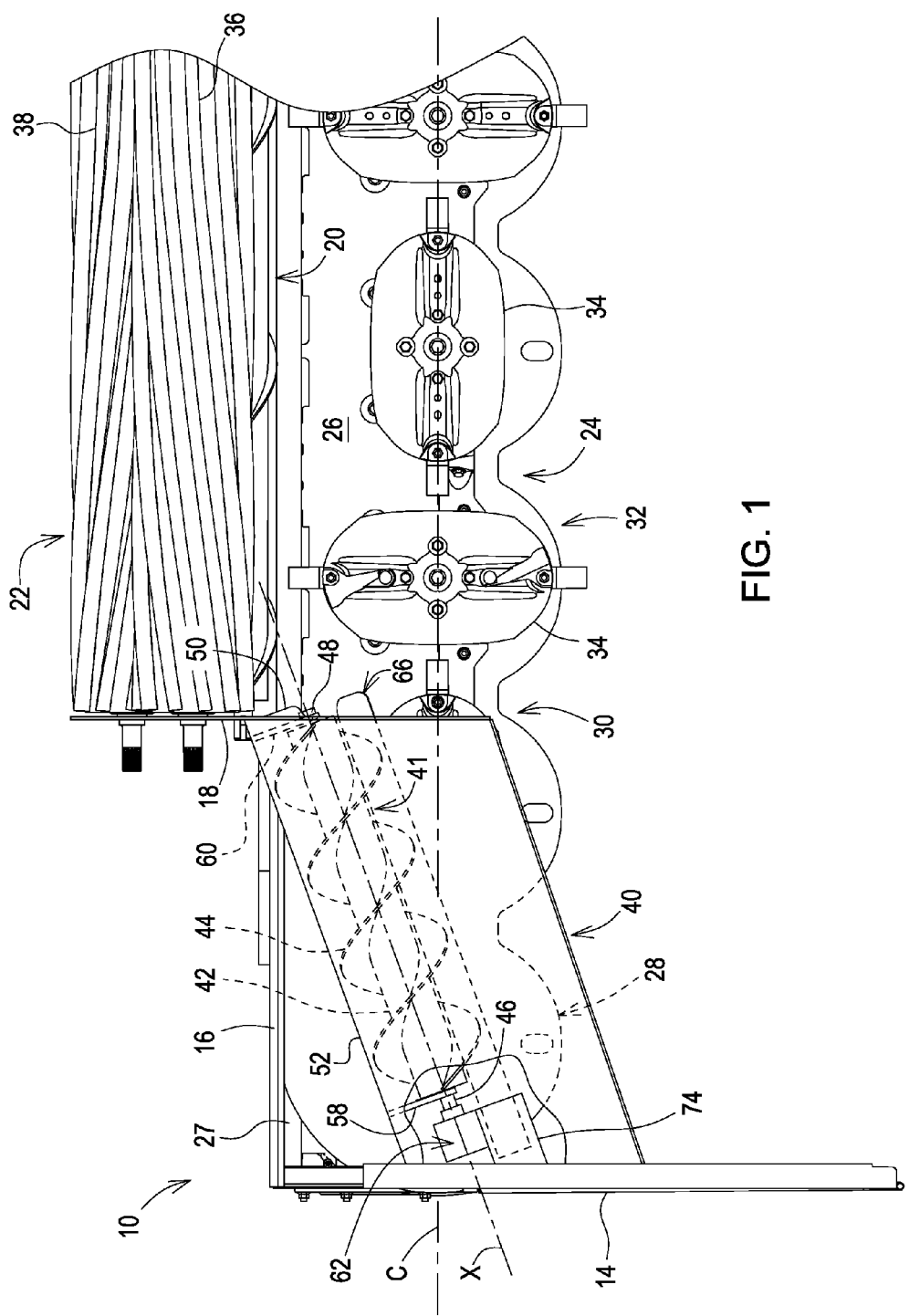
FIG. 1 is a top front view of a right-hand portion of a wide cut harvesting platform embodying an angled converging auger in accordance with the principles of the present invention, with some top parts of the platform being removed and others broken away for clarity.
Figure 2:
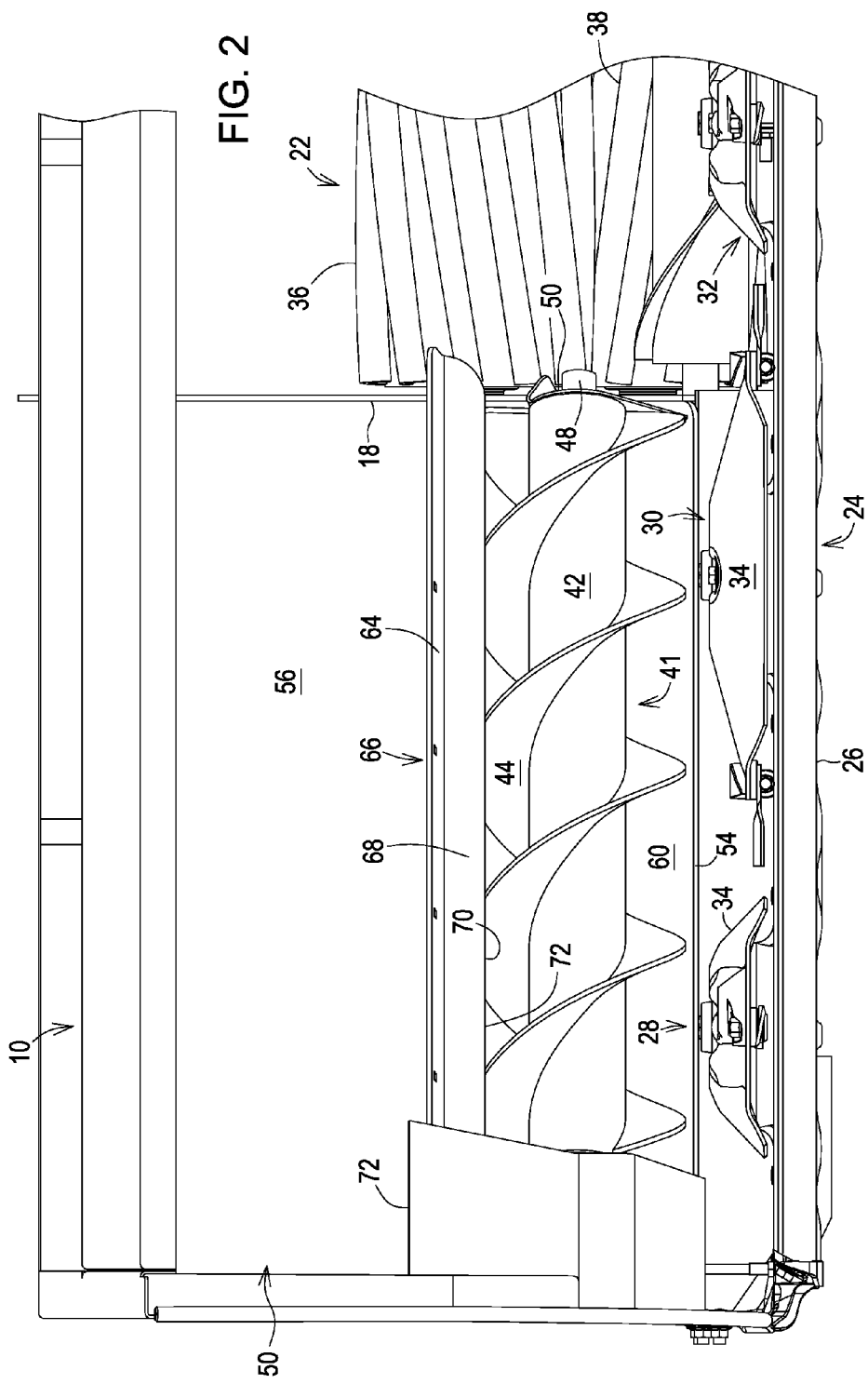
FIG. 2 is an enlarged front view of a part of the platform section shown in FIG. 1 including the angled converging auger.

Referring now to FIGS. 1 and 2, there is shown a portion of an exemplary mowing implement which would benefit from using the present invention, the mowing implement here being embodied as a wide cut mower-conditioner harvesting platform 10 which may be carried at the forward end of a self-propelled mower-conditioner, for example. The platform 10 includes a trough-shaped top frame member 12 (FIG. 3) extending between, and joined to, upper rear regions of right- and left-hand outer side walls, of which only the right-hand outer side wall 14 is shown. Left- and right-hand upright transverse bulkheads, of which only the right-hand bulkhead 16 (FIG. 1) is shown, extend inwardly from the outer side walls. The bulkhead 16 terminates inwardly at, and is joined to, a central region of an upright, fore-and-aft extending, right inner side wall 18. Similarly, the left-hand bulkhead extends inwardly from the left-hand, outer side wall and terminates at, and is joined to, a central region of a left-hand, inner side wall. The left-hand inner side wall together with the right-hand inner side wall 18 defines a crop discharge passage or zone 20 located centrally in the platform 10. A crop conditioner arrangement 22 extends across the discharge passage 20 and has opposite ends respectively supported by the right and left inner side walls. It is to be understood that the location of the discharge zone 20 is not critical and that harvesting platforms having discharge zones which are not centered relative to the platform would benefit from the present invention.

An elongate rotary disc cutter bar 24 extends between, and has opposite ends respectively fixed to, lower rear regions of the right-hand, outer side wall 14 and the corresponding left-hand outer side wall such that the cutter bar is located just forward of the crop conditioner arrangement 22. While the present invention could be advantageously applied to rotary cutter bars of various constructions, the cutter bar 24 is a known type defining a low-profile gear housing 26 containing a plurality of intermeshed spur gears (not shown) including idler and drive gears coupled for effecting rotation of respective drive shafts of a plurality of cutting units spaced substantially evenly along the cutter bar 24. Fixed to the rear side of the cutter bar gear housing 26 is a transverse stiffener beam 27 that extends the full length of the housing 26. For details of the gear housing 26 and enclosed gearing, reference may be made to U.S. Pat. No. 5,964,079, issued to Mellin et al. on Oct. 12, 1999, which is incorporated herein in its entirety by reference.

The number of cutting units that are mounted along the cutter bar 24 outboard of the right inner side wall 18 and corresponding left inner side wall (not shown) would of course vary according to the cutting width of the harvesting platform and the width of the crop conditioner arrangement. The exemplary harvesting platform 10, shown in FIG. 1, includes a right outer cutting unit 28 and a right inner cutting unit 30 having rotation centers located in the gear housing 26 outboard of the right inner side wall 18, with corresponding left outer and inner cutting units (not shown) having rotation centers located in the gear housing 26 outboard of the corresponding left inner side wall (not shown). A rightmost central cutting unit 32 is mounted for rotation about a rotation center located directly in front of the crop discharge passage 20, and thus directly in front of the conditioner arrangement 22.

Each of the cutting units of the cutter bar 24 includes a knife-carrying cutting disc 34 coupled to an upright drive shaft to which power is coupled for rotating the discs 34 in an appropriate direction of rotation for moving crop inwardly and into the conditioner arrangement 22. One rotation scheme for accomplishing such crop movement would be for the cutting discs 34 of each of the cutting units 28, 30 and 32, as viewed in FIG. 2, to be rotated counterclockwise, noting that the corresponding set of cutting discs at the left-hand end region of the cutter bar 24 would be rotated clockwise. Another workable disc rotation scheme would be to rotate the cutting disc 34 of the right outer disc unit 28 counterclockwise while rotating the cutting disc 34 of the adjacent right inner disc 30 in the clockwise direction, with a similar but opposite rotation scheme being applied to the three cutting discs 34 at the left-hand end region of the cutter bar 24. Other schemes would be possible, with the only requirement being that the outermost cutting discs 34 be rotated such that the forward portions of the cutter discs 34 move toward the center of the platform.

The conditioner arrangement 22 includes upper and lower conditioner rolls 36 and 38, respectively, and each conditioner roll includes a central cylindrical drum to which is attached a plurality of axially extending ribs or flutes, with the ribs or flutes of the upper conditioner roll meshing with those of the lower conditioner roll for conditioning crop that passes between them. The upper conditioner roll 36 is positioned forward of the lower conditioner roll 38 so that crop exiting the rolls is given an upward trajectory. The upper conditioner roll 36 has stub shafts at its opposite ends which extend through respective enlarged clearance holes (not shown) provided in the inner side walls, with the stub shafts respectively being received in bearings carried by respective arms (not shown) mounted to the inner side walls for pivoting vertically such that the upper conditioner roll 36 moves toward and away from engagement with the lower conditioner roll 38, with upward movement being resisted by a downward bias provided by a spring-biased linkage (not shown). For details of one way of mounting and biasing the upper conditioner roll 36, reference may be made to U.S. Pat. No. 7,165,381 granted to Rosenbalm et al., which is incorporated herein in its entirety by reference.

It is here noted that the present invention would find utility with other roll type crop conditioners, for example different ways of applying pressure to the rolls or rolls having different crop engaging surface configurations, or crop conditioners using other types of components for effecting conditioning, impeller type conditioners, for example.

Provided for augmenting the rotating cutting discs 34 in conveying cut crop into the discharge passage 20 for further processing by the conditioner rolls 36 and 38 are right- and left-hand converging auger assemblies, with only the right-hand converging auger assembly 40 being shown. As can best be seen in FIG. 1, the auger assembly 40 includes an auger 41 disposed along an axis of rotation X that is inclined inward and to the rear from the right-hand side wall 14 so as to make an angle of approximately 20° with a line of centers C passing through the axes of rotation of the cutting discs 34 of the cutting units 28, 30 and 32. The axis X passes approximately through the axis of rotation of the right-hand outer cutting disc 28. However, it is noted that while the angle the auger 41 makes with the line of centers C is suitable for the platform configuration shown in FIG. 1, as platform widths and conditioner widths vary, the angle of the auger will change. Also, the auger size will determine how close the auger axis X is to the axis of rotation of the cutting disc 34 of the right outer cutting unit 28, with a larger diameter auger resulting in the outer end of the auger being shifted rearward resulting in a smaller angle being defined between the auger axis X and the line of centers C. Further, the auger 41 need not be horizontal, as shown in FIG. 2, but may be slightly angled up or down from horizontal depending on the vertical height of the conditioner arrangement 22.

The auger 41 includes a central cylindrical tube 42 having a circumference to which is fixed a double-set of spirally disposed flighting 44, noting that the number of flights and the pitch of the flights needed for efficient operation is determined by the operating speed of the auger. Opposite ends of the auger 40 are respectively provided with right and left stub shafts 46 and 48, respectively, with each stub shaft being fixed to a circular plate assembly (not shown) that is fixed within a respective end region of the cylindrical tube 42 by known means such as screws or welding, for example. The right-hand auger assembly 40 further includes a crop guide member 50 extending between, and having opposite ends joined to the right-hand, outer side wall 14 and the right-hand inner side wall 18. An, approximately semi-cylindrical, bottom rear portion 52 of the crop guide member 50 has a radius of curvature centered on the axis X and extends approximately about a rear half of the auger 40, with a bottom, horizontal front edge 54 of the semi-cylindrical portion 52 being located just below the bottom of the flighting 44, and with a top wall portion 56 extending forwardly from a top of the semi-cylindrical portion 52. The right and left stub shafts 46 and 48 are respectively supported for rotation by bearings (not shown) respectively carried by right and left shaft support plates 58 and 60 that are joined to the semi-cylindrical part 52 of the crop guide 50. Provided for driving the auger 41 is a variable speed hydraulic motor 62 that is supported by and coupled to the right stub shaft 46.

The auger 41 is driven so as to convey crop in an overshot manner, and mounted to an underside of the top wall portion 56 is a first leg 64 of an elongate auger stripper 66 formed from an angle bar and having a second leg 68 disposed with an edge 70 located close to, and in an upper region of, a cylindrical path swept by an outer edge of the auger fighting 44 so as to strip crop from an upper region of the auger fighting 44. Undershot operation is possible as well, with a stripper then being located adjacent a lower region of the flighting 44.

Closing a gap between a right end of the stripper 66 and the outer right-hand side wall 14 is an upright filler plate 72 having an upper inner rear surface portion engaged with an outer front region of the stripper leg 64 and having a lower rear surface portion engaged with an outer region of the bottom front edge of the semi-circular portion 52 of the crop guide member 50.

During cutting operation, the angled crop converging auger 41 and associated crop guide member 50 (and the corresponding converging auger and crop guide member at the left side of the platform 10) help move the crop along an angle from the outside cut edge of the platform 10 directly to the crop discharge passage 20 in which the crop conditioner arrangement 22 is located. The auger 41 has an advantage over using converging drums in that no crop wedging occurs as is the case with converging drums where there is a tendency of crop wedging between the converging drums.

Further, the semi-cylindrical portion 52 of the crop guide member 50 keeps the crop slightly elevated above the cutting discs 34 so as to keep the crop from unwanted contact with the cutting discs 34 thereby resulting in less recut material and reduced power consumption.

It is noted that an angled undershot auger would also help lift the crop off the discs 34 and move it along a stripper provided at a lower region of the semi-cylindrical portion 52 of the crop guide member 50.

Figure 3:
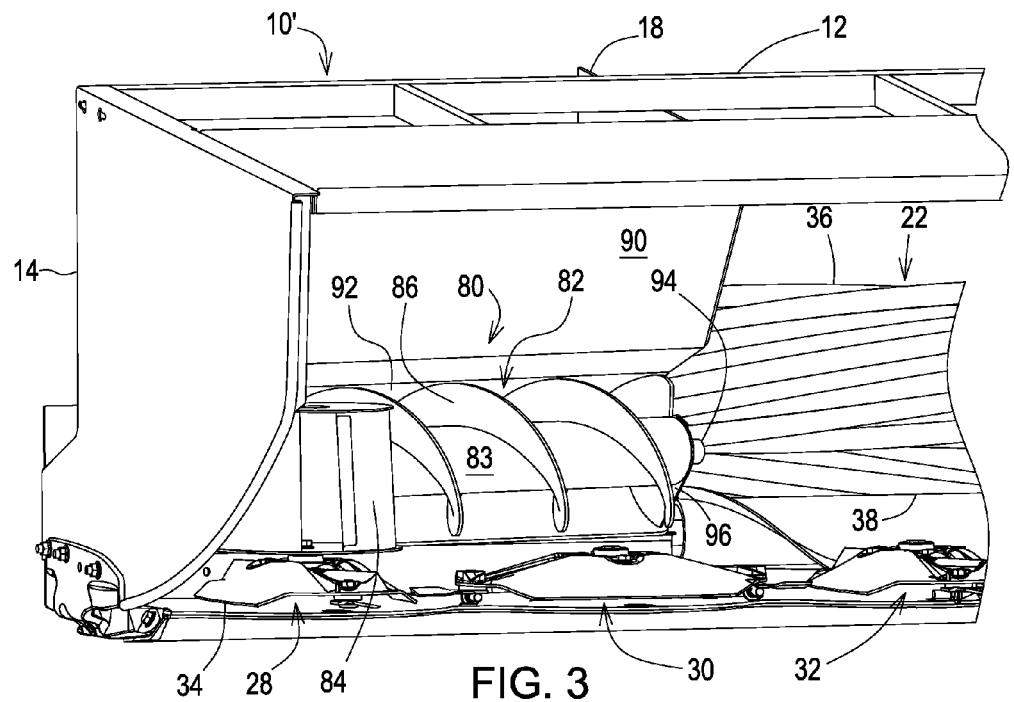
FIG. 3 is a right front perspective view of a right end portion of a wide rotary platform similar to that of FIG. 1, but showing an alternate embodiment wherein an end drum is used in combination with an angled auger for converging cut crop.
Figure 4:
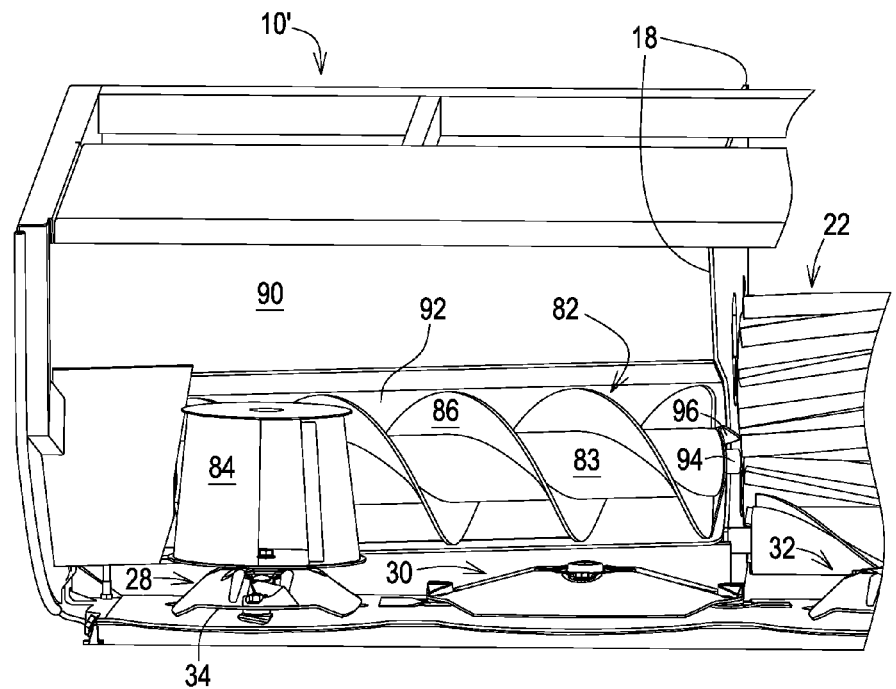
FIG. 4 is an enlarged front view of a part of the platform portion shown in FIG. 3 including the converging drum and angled auger.

Referring now to FIGS. 3 and 4, there is shown a harvesting platform 10' constructed in accordance with a second embodiment of the invention which differs from the first embodiment just described in that the right-hand angled converging auger assembly 40 is replaced by a right-hand angled converging auger assembly 80 including an auger 82 having a center tube 83 that is shorter than the center tube 42 of the auger 41 and has an outer or right-hand end that terminates behind a space occupied by a converging drum 84 that is mounted for rotation with the right-hand outer cutting unit 28, the converging drum 84 having a height which places a top of the drum at an elevation approximately equal to that of the top of spiral flighting 86 of the auger 82.

Like the previously described embodiment, a crop guide member 90 includes a semi-cylindrical portion 92 located at a radius to a central axis of the auger 82 and has right and left stub shafts (only left stub shaft 94 being shown) supported for rotation in bearings (not shown) carried by right and left shaft support plates (only left plate 96 being shown) fixed to the semi-cylindrical portion 92 of the guide member 90. It is to be understood that the auger 82 would be driven by a variable speed hydraulic motor coupled to the right stub shaft in a manner similar to the manner in which the variable speed hydraulic motor 62 is coupled to the stub shaft 46 of the previously described angled converging auger assembly 40.

The converging drum 84 is thus positioned for receiving the crop cut by the outer cutting unit 28 and for delivering the cut crop inwardly to the angled converging auger 82, which delivers the crop to the crop discharge passage or zone 20, and, hence, to the crop conditioner arrangement 22. Since there is only one converging drum 82, the problem of crop wedging between adjacent converging drums is not present.

Having described the preferred embodiment, it will become apparent that various modifications can be made without departing from the scope of the invention as defined in the accompanying claims.

The invention claimed is:

1. In a wide cut crop harvesting platform having right- and left-hand opposite fore-and-aft extending outer side walls, a rotary cutter bar extending between the outer side walls and having a width greater than a crop conditioning arrangement positioned between right- and left-hand, fore-and-aft extending inner side walls defining a crop discharge path located rearward of the cutter bar whereby crop cut outboard of the conditioning arrangement must be moved inwardly before passing through the conditioning arrangement, the rotary cutter bar including inner and outer rotary cutting units located outboard of each of opposite lateral sides of the crop discharge path containing the crop conditioning arrangement, with each cutting unit including a knife-carrying disc mounted to a drive shaft rotatable about a vertical axis, and a crop converging arrangement located outboard of each of opposite sides of the conditioning arrangement for aiding in moving crop cut by the knife-carrying discs respectively of the inner and outer rotary cutting units at each of the opposite lateral sides of the crop discharge path, the improvement comprising, said crop converging arrangements each including an auger having an inner end terminating at an adjacent one of the inner side walls and an outer end located forwardly of said inner end.

2. The wide cut crop harvesting platform, as defined in claim 1, wherein the outer end of each auger terminates adjacent a respective one of the fore-and-aft extending outer side walls.

3. The wide cut crop harvesting platform, as defined in claim 1, and further including a converging drum being mounted to the drive shaft of the knife-carrying disc of each outer cutting unit for rotation with the disc; and each converging auger having an outer end terminating adjacent to one of the converging drums.

4. The wide cut crop harvesting platform, as defined in claim 2, wherein each auger has an axis of rotation which extends above adjacent ones of the inner and outer rotary cutting units and intersects the vertical axis of the drive shaft of the knife-carrying disc of the adjacent outer rotary cutting unit.

5. The wide cut crop harvesting platform, as defined in claim 4, wherein the axis of rotation of each auger makes an angle of approximately 20° with a line of centers through the adjacent vertical axes of the shafts respectively associated with the adjacent inner and outer cutting units.

6. The wide cut crop harvesting platform, as defined in claim 1, and further including a crop guide member including a substantially semi-cylindrical portion extending about a rear portion of each converging auger, with the semi-cylindrical portion being located at a radius about the axis of the associated converging auger and having a lower edge located at a height sufficiently close to a height of a top of the cutting units that the crop guide member aids in keeping cut crop elevated above the cutting units, and thereby minimizes unwanted contact between the cut crop and the cutting discs and thus minimizes the amount of recut crop and power consumption that would result from recutting.

7. The wide cut crop harvesting platform, as defined in claim 6, wherein said augers are one of overshot or undershot augers, and wherein each said crop guide member includes an elongate crop stripper secured to the guide member at an appropriate location adjacent the approximately semi-cylindrical portion of the guide member, depending on whether the operation of the auger is overshot or undershot, for stripping crop from the auger.

* * * * *